US006555217B1

(12) United States Patent
Mueller et al.

(10) Patent No.: US 6,555,217 B1
(45) Date of Patent: Apr. 29, 2003

(54) SELF-SUPPORTING AND REDETACHABLE ADHESIVE ARTICLE

(75) Inventors: Wolf-Ruediger Mueller, Hilden (DE); Joerg Kuhn, Moenchengladbach (DE); Bernd W. Peters, Solingen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/701,620

(22) PCT Filed: May 27, 1999

(86) PCT No.: PCT/EP99/03662

§ 371 (c)(1), (2), (4) Date: Jan. 22, 2001

(87) PCT Pub. No.: WO99/64530

PCT Pub. Date: Dec. 16, 1999

(30) Foreign Application Priority Data

Jun. 5, 1998 (DE) .......................................... 198 25 291

(51) Int. Cl.[7] .............................................. B32B 27/30
(52) U.S. Cl. ...................... 428/355 RA; 428/355 EN; 428/355 AC; 428/343; 156/344; 156/332; 156/327; 524/56; 524/58
(58) Field of Search ............................. 428/41.3, 41.5, 428/41.6, 41.8, 343, 352, 354, 355 R, 355 CP, 355 AC, 355 RA; 524/58, 56, 367, 377, 378, 391, 460, 560, 561; 156/344, 332, 327

(56) References Cited

U.S. PATENT DOCUMENTS

| 4,759,983 | A | * | 7/1988 | Knutson et al. ............ 428/343 |
|---|---|---|---|---|
| 5,049,608 | A | | 9/1991 | Medina ....................... 524/375 |
| 5,393,529 | A | * | 2/1995 | Hoffman et al. ............. 424/445 |
| 6,121,508 | A | * | 9/2000 | Bischof et al. ................ 602/52 |
| 6,174,536 | B1 | * | 1/2001 | Crotty et al. ................ 424/402 |
| 6,296,932 | B1 | * | 10/2001 | Crandall et al. ...... 428/355 AC |

FOREIGN PATENT DOCUMENTS

| CA | 2105434 | 3/1994 |
|---|---|---|
| DE | 28 04 942 | 8/1979 |
| DE | 43 19 023 | 9/1994 |
| EP | 0 155 557 | 2/1985 |
| FR | 2158266 | 6/1973 |
| WO | WO 97/14510 | 4/1997 |

* cited by examiner

Primary Examiner—Robert Dawson
Assistant Examiner—Christopher Keehan
(74) Attorney, Agent, or Firm—Stephen D. Harper; Glenn E. J. Murphy

(57) ABSTRACT

A self-supporting and self-adhesive molded article is described having a glass transition temperature of less than 10° C. and containing a binder and an aliphatic or cyoaliphatic nonionic surfactant. The binder may contain at least one addition polymer or addition copolymer. The article is redetachable from the material surfaces to which it may be adhered. Thus, the article may be attached, detached and reattached to a wall or cabinet surface and may have paper or other light weight, decorative material attached, detached and reattached to it. The detachment and reattachment process maybe repeated numerous times, particularly with intervening cleaning of the surface of the self-supporting and self-adhesive molded article.

41 Claims, No Drawings

SELF-SUPPORTING AND REDETACHABLE ADHESIVE ARTICLE

The invention relates to a support-free pressure-sensitively adhesive shaped article having a glass transition temperature of less than 10° C. which comprises a binder and a nonionic surfactant or a mixture of two or more nonionic surfactants, the binder present comprising an addition polymer or addition copolymer. The invention further relates to a process for producing such support-free, pressure-sensitively adhesive shaped articles and to the use of nonionic surfactants for adjusting the bond strength of a pressure-sensitively adhesive shaped articles.

For the decorative or functional outfitting of spaces for private or commercial use, one frequent task is to fasten information materials of paper or relatively lightweight functional articles, of metal, glass or plastic, for example, to vertical, inclined or horizontal surfaces, for example, to tables, cupboards or walls, in a durable but redetachable fashion. Whereas with heavy and compact articles which exceed a weight of about 1 kg, for example, mechanical fastening in the form of screws or nails, for example, is generally indispensable, there are various methods appropriate for the fastening of relatively lightweight paper articles, in the form of webs or sheets, for example.

For instance, thumbtacks or adhesive tapes with a pressure-sensitive adhesive coating on one or two sides are frequently used for the fastening of paper articles, examples being wall-mounted calendars, posters, photographs and the like. In practice, however, such fastening methods are frequently accompanied by disadvantages. Thumbtacks, for example, leave behind unsightly holes on the surfaces selected for the fastening, these holes generally having to be eliminated again following removal of the fastened article in order to re-establish the original visual appearance of the surface selected for fastening. This form of fastening has the further disadvantage that when used to fasten materials in web or sheet form which have a relatively high weight per unit area, examples being posters or calendars, a frequent occurrence is that the fastening is torn out at at least one fastening point, especially if the fastened article is subjected, deliberately or otherwise, to a load.

The use of adhesive strips with a pressure-sensitive adhesive coating has great disadvantages in particular when this fastening form is employed on papered walls. In general, the tensile strength and tensile shear strength of the pressure-sensitive adhesives are so great that the removal of the adhesive tape from the wall in question frequently entails removal of parts of the wallpaper as well, either leaving the wall with an unsightly overall appearance or requiring remedy by wallpapering or at least—possibly colored—covering of the area thus damaged.

For example, DE-C 43 19 023 describes a pressure-sensitive, carrierless, double-sidedly self-adhesive tape and the use of a polyacrylate pressure-sensitive adhesive for its production.

The tape is described, for example, for the durable fastening of photographs to different substrates such as Plexiglass, aluminum, polystyrene, PVC or paper. Importance is attached merely to the redetachability from specially siliconized films: redetachability from paper is not envisaged and is not mentioned. DE-A 28 04 942 relates to a process for producing crosslinked pressure-sensitive adhesive films from aqueous polymer emulsions or polymer dispersions. In this case, aqueous polymer emulsions or polymer dispersions which after drying give a self-adhesive film with good adhesion to the substrate are admixed with a water-soluble polyacrylic hydrazide crosslinking agent, the mixture obtained is applied to a flexible substrate, which may consist, for example, of paper, fiber nonwoven, a woven fabric or a film of plastic or modified natural material, and the applied mixture is crosslinked on this substrate by brief heat exposure at a temperature of from 60 to 160° C.

WO 97/14510 relates to water-based adhesives which comprise microbeads. The document describes a water-based adhesive composition which comprises a mixture of an aqueous concentrate of solid, self-adhesive, elastomeric, polymeric microbeads, an aqueous, acrylic-based pressure-sensitively adhesive binder, from 0.01 to 5% by weight of a surfactant and from 0.01 to 3% by weight of a viscosity modifier. The adhesive compositions described feature asymmetric distribution of the bond strength and the surfactants they comprise may include nonionic surfactants.

DE-A 33 19 78 describes the use of the reaction products of ethylene oxide with aliphatic vicinal diols as emulsifiers for emulsion polymerization. The use is described of ring opening products of 1,2-epoxyalkanes with ethylene glycol, which have been subsequently reacted with ethylene oxide, in the emulsion polymerization of compounds having an olefinically unsaturated double bond.

DE-T 693 09 202 (corresponding to EP-B 0 587 332) relates to an acrylic sealing compound which comprises an acrylic emulsion copolymer binder having a glass transition temperature of from about 0 to about −60° C., zinc oxide and solid silicon dioxide. The document mentions sealing compounds which comprise a nonionic surfactant based on octylphenol.

Adhesive tapes which are also intended to be redetachable from sensitive surfaces frequently comprise a large amount of low molecular mass plasticizers. When such adhesive tapes are put to long-term use on absorbent surfaces, they often leave behind marks and discolorations on the substrate in question, owing to the migration of the plasticizer molecules. Although such adhesive tapes circumvent the mechanical destruction of the substrate at the time of fastening or of detachment, they nevertheless leave the fastening site in a usually unsightly state. Where such adhesive tapes are additionally colored, for decorative purposes, a further frequent observation is migration of the dye into the bonded material, further intensifying the unattractive overall appearance of the former fastening site following detachment. There is therefore a need for a pressure-sensitively adhesive shaped article which does not have the abovementioned disadvantages. In particular, there was a need for a pressure-sensitively adhesive shaped article which permits durable fastening of even relatively heavy articles on surfaces of a very wide variety of types and with vertical, inclined or horizontal orientation. Furthermore, there was a need for pressure-sensitively adhesive shaped articles which are redetachable from a wide variety of surfaces and which following detachment may be used again for the durable fastening of articles. There was a need, moreover, for pressure-sensitively adhesive shaped articles which in the case of falling bond strength may be reset to the original bond strength, or at least to a value close to the original bond strength, by simple cleaning. Moreover, there was a need for pressure-sensitively adhesive shaped articles which following detachment, even after long-term use for fastening, cause no marking or discoloration of the substrate or of the fastened object.

It was therefore an object of the present invention to provide a pressure-sensitively adhesive shaped article which meets the needs described above. It was also an object of the present invention to provide a pressure-sensitively adhesive shaped article production process which leads to pressure-sensitively adhesive shaped articles which meet the above needs. Moreover, it was an object of the invention to provide a method which permits the bond strength of pressure-sensitively adhesive shaped articles to be adjusted within a wide range.

The abovementioned objects are achieved by means of a support-free pressure-sensitively adhesive shaped article which has a glass transition temperature of less than 10° C. and comprises at least one binder and a certain amount of an aliphatic or cycloaliphatic nonionic surfactant.

The invention accordingly provides a support-free pressure-sensitively adhesive shaped article having a glass transition temperature of less than 10° C., comprising at least 90% by weight of a binder and from 0.01 to 1.44% by. weight of an aliphatic or cycloaliphatic nonionic surfactant, the binder present comprising an addition polymer or addition copolymer.

In the context of the present invention, a "shaped article" is an article having any desired three-dimensional form. The shaped article of the invention may, for example, be weblike, sheetlike, spherical, ellipsoid, rhomboid, star-shaped, cuboid, blocklike or adapted two- or three-dimensionally in its spatial form to known shapes, for example shapes from nature or industry. In one preferred embodiment of the invention, the shaped article is in web or sheet form and has a thickness of about 0.01 to about 10 mm, in particular from about 0.1 to about 5 mm or from about 0.5 to about 2 mm.

In another preferred embodiment, the shaped article is in web form and has the outlines of known forms from nature or industry, for example an animal shape or the shape of water, land or air vehicles.

The pressure-sensitively adhesive shaped article of the invention comprises a support-free, i.e. self-supporting, pressure-sensitively adhesive shaped article whose desired mechanical properties are achieved without an assisting support material. In one particular embodiment of the invention, however, at least one surface of the shaped article may be provided with a coating which although detachable is designed to be more firmly adhering than a coating of a second surface. For instance, the pressure-sensitively adhesive shaped articles of the present invention having, for example, a nonadhesive coating may first be affixed as decorative elements to surfaces. By peeling off the coating it is then possible at any time subsequently to achieve a surface tackiness which permits the fastening of an article, for example a paper article in web or sheet form, to the pressure-sensitively adhesive surface of the shaped article of the invention.

The support-free pressure-sensitively adhesive shaped article has a glass transition temperature (Tg) of less than 10° C. In one preferred embodiment of the invention, the pressure-sensitively adhesive shaped article has a glass transition temperature (Tg) of from about 0 to about −60° C., in particular from about −20 to about −50° C.

The "glass transition temperature" (Tg) is the temperature at which the Brownian molecular motion of relatively long chain segments (from about 5 to about 50 chain atoms) of a polymer begins. The glass transition temperature is dependent on the measurement method, it being possible to effect measurement by means, for example, of thermal-calorimetric, dielectric, dynamomechanical, refractometric or NMR-spectroscopic measurements. In the context of the present invention, therefore, Tg refers to the temperature measured using differential scanning calorimetry (DSC).

The pressure-sensitively adhesive shaped article of the invention comprises at least approximately 90% by weight of a binder, the binder present being at least one addition polymer or addition copolymer.

In the context of the present invention, a "binder" is a polymer, copolymer or a mixture of two or more polymers or two or more copolymers, or a mixture of one or more polymers with one or more copolymers, which is essentially responsible for the mechanical, adhesive and cohesive properties of the pressure-sensitively adhesive shaped article. The pressure-sensitively adhesive shaped article of the invention comprises as binder at least one addition polymer or addition copolymer, the term "addition polymer" or "addition copolymer" being understood to be a compound obtainable by free-radical, anionic, cationic or group-transfer polymerization. The addition polymers or addition copolymers used in the context of the present invention may be obtained accordingly by corresponding addition polymerization of compounds having at least one olefinically unsaturated double bond.

Preferably, the polymers or copolymers used to prepare the binder are in the form of an aqueous emulsion or dispersion having a solids content of between about 20 and about 90% by weight, in particular between about 40 and about 60% by weight. Suitable emulsions or dispersions may be obtained, for example, by emulsion polymerization of monomers having an olefinically unsaturated double bond.

In one preferred embodiment of the invention, use is made of emulsion polymers as obtainable by addition polymerization of esters or amides of acrylic or methacrylic acid with alcohols having about 1 to about 9 carbon atoms. Thus it is possible, for example, to use addition polymers as obtained by emulsion polymerization of methyl, ethyl, propyl, isopropyl, butyl, hexyl, heptyl, octyl or 2-ethylhexyl or nonyl esters of acrylic acid or methacrylic acid. It is likewise possible to use the addition polmers obtained by emulsion polymerization of N-alkylamides of acrylic acid or methacrylic acid.

Likewise suitable are emulsion polymers as obtainable by addition polymerization of acrylic acid or methacrylic acid with alcohols having 10 or more carbon atoms. Examples of these are decyl acrylate, decyl methacrylate, isodecyl acrylate, isodecyl methacrylate, undecyl acrylate, undecyl methacrylate, dodecyl acrylate, dodecyl methacrylate and their higher homologs having up to about 30 carbon atoms.

Likewise suitable as monomers for preparing the addition polymers or addition copolymers used as binders are derivatives of acrylic acid or methacrylic acid which carry functional groups such as OH groups or amino groups. The stated compounds include, for example, hydroxymethyl acrylate, hydroxymethyl methacrylate, hydroxypropyl acrylate or hydroxypropyl methacrylate.

Further suitable addition polymers are those of arylamides or substituted acrylamides, styrene or substituted styrenes, butadiene, acrylonitrile or methacrylonitrile.

It is likewise possible to use addition polymers or addition copolymers as obtainable by emulsion polymerization of vinyl esters. Examples of suitable vinyl esters are vinyl acetate, vinyl propionate, vinyl 2-ethylhexanate, and higher esters of vinyl alcohol. Similarly suitable are addition polymers of vinyl halides. Preferred vinyl halides are vinyl chloride and vinylidene chloride.

In minor amounts, it is also possible to use silicone-containing monomers such as, for example, vinyltrialkoxysilanes, allyltrialkoxysilanes, (meth)acryloyloxyalkyltrialkoxysilanes, (meth)acryloyloxyalkylalkyldialkoxysilanes, (meth)acryloyloxyalkoxyalkyltrialkoxysilanes and mercaptoalkyltrialkoxysilanes. The abovementioned compounds may be polymerized alone or in a mixture of two or more thereof.

The addition polymers or addition copolymers which may be used as binders in the context of the present invention may also comprise, for example, dissociable, water-soluble monomers. These include, for example, acrylic acid, methacrylic acid, itaconic acid, maleic acid, fumaric acid, monoesters of maleic acid, crotonic acid, vinylphosphonic acid, vinylsulfonic acid or 2-acrylamido-2-methylpropanesulfonic acid (AMPS). Besides said acids it is also possible to use their salts, for example, salts with alkali metals, ammonia or primary, secondary or tertiary alkylamines. Said dissociable compounds may be used as comonomers either alone or as a mixture of two or more thereof.

In one preferred embodiment of the invention, the binder used comprises a polymer used by addition polymerization of an acrylic or methacrylic ester which has about 2 to about 8, preferably about 3 to about 6, carbon atoms in the alcohol residue. In another preferred embodiment of the invention, the addition copolymer used comprises a copolymer obtainable by addition copolymerization of an acrylic or methacrylic ester having about 2 to 8, preferably about 3 to about 6, carbon atoms in the alcohol residue of the acrylic acid or methacrylic acid.

If the binder is to comprise a copolymer having dissociable groups, then in a preferred embodiment of the invention a copolymer is used which has been prepared using acrylic acid or methacrylic acid or their mixture as dissociable comonomer. The fraction of acrylic acid or methacrylic acid or their mixture as a proportion of the overall monomer mixture used to prepare the polymer is in this case from about 0.1 to about 10% by weight.

In one preferred embodiment of the invention, the shaped article comprises as binder an addition polymer or a mixture of two or more addition polymers or an addition copolymer or a mixture of two or more addition copolymers, or a mixture of one or more addition polymers and one or more addition copolymers, prepared by addition polymerization of an ester of acrylic acid or of a mixture of two or more esters of acrylic acid or of an ester of methacrylic acid or of a mixture of two or more esters of methacrylic acid, or a mixture of one or more esters of acrylic acid and one or more esters of methacrylic acid, with a linear or branched, saturated or unsaturated alcohol having 1 to 24 carbon atoms, or a mixture of two or more thereof.

Suitable binder emulsions or binder dispersions as may be used in the context of the present invention for producing the support-free, pressure-sensitively adhesive shaped article of the invention are available commercially. For example, the following acrylic dispersions may be used: Rhodotak 300 (manufacturer: Rhone Poulenc), Primal J 200, Primal EP 6090, Primal E 1950, Primal LC 68, Primal 3362, Primal E 2620, Primal CA 122, Primal 1785 (manufacturer: Rohm+Haas), Acronal DS 3496 X, Acronal 290 D (manufacturer: BASF) or Mowilith DM 772 (manufacturer: Hoechst).

The binder content of the shaped articles of the invention is at least 90% by weight. In one preferred embodiment, however, the shaped article contains at least 95% by weight of the binder, for example, more than 96% by weight, more than 97% by weight, or even more than 98% by weight. In some cases, the fraction of binder may even be up to 99% by weight or more.

In another preferred embodiment, the shaped article comprises a binder which contains at least 50% by weight of polybutyl acrylate.

In addition to the abovementioned binder, the shaped article of the invention contains from 0.01 to 1.44% by weight of an aliphatic or cycloaliphatic nonionic surfactant.

In one preferred embodiment of the invention, the shaped article is essentially substantially free from nonionic surfactants having an aromatic structural component; in other words, the fraction of such surfactants is less than 0.1% by weight, based on the shaped article.

Nonionic surfactants have surface-active properties without forming ions in the aqueous medium. The water-solubility of nonionic surfactants is generally governed by hydrophilic polyether chains. Nonionic surfactants are generally prepared by making use of the ethoxylation of compounds containing active hydrogen atoms, among which adducts of ethylene oxide with fatty alcohols or oxo alcohols possess the greatest importance. Another type of nonionic surfactants are the alkyl polyglycosides, which are obtained by reacting sugars with fatty alcohols.

Examples of nonionic surfactants as may be used in the context of the present invention are fatty alcohol polyglycol ethers, fatty acid polyglycol esters, fatty acid amido polyglycol ethers, fatty acid amino polyglycol ethers, alkoxylated polyols such as alkoxylated glycerol, alkoxylated trimethylolpropane, alkoxylated pentaerythritol or alkoxylated triethylol-propane, alkyl oligoglycosides and polyglycosides, fatty acid N-alkylglucamides, polyol fatty acid esters, sugar esters, sorbitan esters and polysorbates.

In the context of the present invention it is also possible as nonionic surfactant, or as a mixture of two or more nonionic surfactants, to use the amides of alkylcarboxylic acids, preferably of alkylcarboxylic acids having 6 to about 24 carbon atoms, with alkanolamines, preferably monoalkanolamides. Particular preference is given to amides obtainable from natural or synthetically prepared fatty acids and fatty acid cuts with aminoethanol, very particular preference being given to the monoethanolamides of coconut fatty acid cuts, especially the fatty acid cuts with 8 to 14 carbon atoms, and ethanolamine.

In the context of the present invention, in one preferred embodiment, the nonionic surfactant used comprises a compound or a mixture of two or more compounds of the general formula I

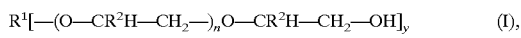

$$R^1[-(O-CR^2H-CH_2-)_nO-CR^2H-CH_2-OH]_y \qquad (I),$$

in which $R^1$ in each case independently represents a linear or branched, saturated or unsaturated alkyl radical of 2 to 26 carbon atoms, optionally substituted by secondary or tertiary OH groups, or a mono- or polycyclic cycloalkyl radical of 4 to 26 carbon atoms, optionally substituted by secondary or tertiary OH groups, $R^2$ represents hydrogen or a linear or branched alkyl radical of 1 to about 10 carbon atoms, n represents a number from 0 to 200 and y represents a number from 1 to 6, or an alkyl polyglycoside or a mixture of two or more alkyl polyglycosides of the general formula II

$$R^3O-(Z)_x \qquad (II),$$

where $R^3$ independently represents a linear or branched, saturated or unsaturated alkyl radical of 2 to 24 carbon atoms, Z independently at each occurrence represents a monosaccharide or oligosaccharide of a sugar having 5 or 6 carbon atoms and x represents a number from 1.1 to 5, or a mixture of two or more compounds of the general formula I and II.

In a further preferred embodiment, the shaped article of the invention comprises as nonionic surfactant a compound or a mixture of two or more compounds of the general formula I or of the general formula II, or a mixture of two or more compounds of the general formula I and of the general formula II, where $R^1$ and $R^3$ independently of one another represent a linear or branched, saturated or unsaturated alkyl radical of 8 to 16 carbon atoms, $R^2$ represents hydrogen or methyl, Z represents a glucose radical and x represents a number from 1.1 to 1.4.

For example, nonionic surfactants which may be used in the context of the present invention include adducts of alkylene oxides with linear, aliphatic alcohols of 8 to 16 carbon atoms. Ethylene oxide and propylene oxide are preferred alkylene oxides. Ethylene oxide is particularly preferred. Typical examples of such alcohols are fatty alcohols, for example, caproyl alcohol, caprylyl alcohol, 2-ethylhexyl alcohol, capryl alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, behenyl alcohol, erucyl alcohol and brassidyl alcohol and also their technical mixtures obtained, for example, in the high-pressure hydrogenation of technical methyl esters based on fats and oils or aldehydes from the Roelen oxo synthesis and also as a monomer fraction in the dimerization of unsaturated fatty alcohols. In the context of this exemplary application, particular preference is given to technical fatty alcohol mixtures in which the fatty alcohols present have about 12 to about 18 carbon atoms, examples being coconut, palm, palm kernel or tallow fatty alcohols.

In the context of these exemplary applications, particular preference is given to the ethoxylation products of coconut fatty alcohols, the degree of ethoxylation being on average from about 5 to about 40, for example, from about 10 to about 30, and in particular about 20.

As nonionic surfactants it is also possible to use the alkyl polyglycosides or the fatty acid glucamides.

Suitable alkyl polyglycosides are represented, for example, by the general formula II. The radical $R^3$ preferably represents an alkyl radical of about 6 to about 22 carbon atoms and may be both linear and branched. Preference is given to primary alkyl radicals which are linear or are methyl-branched in position 2. Examples of such alkyl radicals $R^3$ are 1-octyl, 1-decyl, 1-lauryl, 1-myristyl, 1-cetyl or 1-stearyl radicals. 1-Octyl, 1-decyl, 1-lauryl or 1-myristyl radicals are particularly preferred. When the so-called "oxo alcohols" are used as starting materials for preparing the alkyl polyglycosides of the general formula II, compounds having an odd number of carbon atoms in the alkyl chain $R^3$ are predominant.

The alkyl polyglycosides of the general formula II which may be used in accordance with the invention may contain, for example, only one specific radical $R^3$. Usually, however, alkyl polyglycosides are prepared from natural fats and oils or mineral oils. In this case, the alkyl radicals $R^3$ present comprise mixtures in accordance with the starting compounds and/or in accordance with the respective workup of these compounds.

Particular preference is given to alkyl polyglycosides of the general formula II wherein $R^3$ essentially represents $C_8$ and $C_{10}$ alkyl groups,
essentially represents $C_{12}$ and $C_{14}$ alkyl groups,
essentially represents $C_8$ to $C_{18}$ alkyl groups, or
essentially represents $C_{12}$ to $C_{16}$ alkyl groups.

As the sugar unit Z it is possible to use any desired monosaccharides or oligosaccharides. It is usual to use sugars having 5 or 6 carbon atoms, and their corresponding oligosaccharides. Examples of such sugars are glucose, fructose, galactose, arabinose, ribose, xylose, lyxose, allose, altrose, mannose, gulose, idose, tallose and sucrose. Preferred sugar units are glucose, fructose, galactose, arabinose and sucrose; among these, glucose is particularly preferred.

The alkyl polyglycosides of the general formula II that may be used in the context of the invention comprise on average from about 1.1 to 6, preferably from about 1.1. to 5, sugar units. Alkyl polyglycosides having values for x of from 1.1 to about 1.6 are particularly preferred.

The alkoxylated homologs of the abovementioned alkyl polyglycosides of the general formula II may also be hi used in accordance with the invention. These homologs may comprise on average up to about 10 ethylene oxide units or propylene oxide units, or a mixture thereof, per alkyl glycoside unit.

Likewise suitable for use as nonionic surfactants in the shaped articles of the invention are surfactants from the family of the glucamides, for example, alkyl N-methylglucamides, the term alkyl referring to alkyl radicals having a chain length of about 6 to about 14 carbon atoms. It may be advantageous if the nonionic surfactants described are used not as sole nonionic surfactant but in a mixture with at least one further nonionic surfactant, in combination with fatty alcohol ethoxylates, alkyl polyglycosides, or in combination with fatty alcohol ethoxylate and glucamide, or in combination with glucamide and alkyl polyglycoside, for example. Also possible if desired are quaternary or even higher combinations of the nonionic surfactants disclosed herein. Suitability extends to the reaction products of ethylene oxide with unbranched 1,2-diols of 8 to 24 carbon atoms. Products of this kind are obtained, for example, by subjecting linear 1,2-epoxyalkanes with an even number of carbons, or mixtures thereof, to catalytic ring opening with ethylene glycol and then reacting the product with ethylene oxide. Such a process, and the products it produces, are described, for example, in DE-A 33 19 782, the disclosure content of which is expressly incorporated by reference in the context of the present text.

In the context of the present invention it is preferred for the nonionic surfactants used to be saturated, i.e., to have no C—C double or triple bond. It is also preferred in the context of the present invention for the nonionic surfactants to be free from halogens, i.e., to have no fluorine, chlorine, bromine or iodine atoms.

The invention likewise provides for the use of a compound or of a mixture of two or more compounds of the general formula I

$$R^1[-(O-CR^2H-CH_2-)_nO-CR^2H-CH_2H-OH]_y \qquad (I),$$

in which $R^1$ in each case independently represents a linear or branched, saturated or unsaturated alkyl radical of 2 to 26 carbon atoms, optionally substituted by secondary or tertiary OH groups, or a mono- or polycyclic cycloalkyl radical of 4 to 26 carbon atoms, optionally substituted by secondary or tertiary OH groups, $R^2$ represents hydrogen or a linear or branched alkyl radical of 1 to about 10 carbon atoms, n represents a number from 0 to 200 and y represents a number from 1 to 6, or an alkyl polyglycoside or a mixture of two or more alkyl polyglycosides of the general formula II

$$R^3O-(Z)_x \qquad (II),$$

where $R^3$ independently at each occurrence represents a linear or branched, saturated or unsaturated alkyl radical of 2 to 24 carbon atoms, Z independently at each occurrence represents a monosaccharide or oligosaccharide of a sugar having 5 or 6 carbon atoms and x represents a number from 1.1 to 5, or a mixture of two or more compounds of the general formula I and II, for adjusting the bond strength of a pressure-sensitively adhesive shaped article.

In one preferred embodiment of the invention, the pressure-sensitively adhesive shaped article has a glass transition temperature (Tg) of less than 10° C. and contains at least 90% by weight of an addition polymer or addition copolymer or a mixture thereof.

The invention additionally provides a process for producing a pressure-sensitively adhesive shaped article, in which an aqueous dispersion, comprising an addition polymer or an addition copolymer or a mixture thereof, which after drying gives a pressure-sensitively adhesive shaped article, is mixed with from 0.01 to 1.44% by weight of an aliphatic or cycloaliphatic nonionic surfactant and processed to a pressure-sensitively adhesive shaped article.

The invention further provides a method of adjusting the bond strength of a pressure-sensitively adhesive shaped article, in which an aqueous dispersion of an addition polymer or of an addition copolymer or a mixture thereof, which after drying gives a pressure-sensitively adhesive shaped article, is mixed with from 0.01 to 1.44% by weight of an aliphatic or cycloaliphatic nonionic surfactant and processed to a pressure-sensitively adhesive shaped article.

Besides binder and nonionic surfactant, the pressure-sensitively adhesive shaped article of the invention may also comprise further additives. Examples of additives which may be used include defoamers, preservatives or dyes.

Examples of suitable defoamers are fatty acid partial esters, for example, Baysilon EN (manufacturer Bayer, Leverkusen) or polydimethylsiloxane, for example, Antischaummittel [Antifoam] SE 2 (manufacturer: Wacker, Burghausen). Defoamers may be used individually or as a mixture of two or more thereof. If nonionic surfactants already having a defoaming action are used in the shaped article of the invention, then the use of defoamers may in general be omitted entirely only a small amount is necessary. In such cases, the amount of the defoamer is from about 0.05 to about 0.2% by weight, based on the weight of the shaped article.

Examples of suitable preservatives are isothiazoline-bromopol mixtures, as sold under the name Ginser, for example Ginser 422, by Ginser GmbH. If preservatives are not to be omitted, then the concentration of the preservatives is from about 0.01 to about 0.1% by weight, based on the weight of the shaped article.

As dyes it is possible, for example, to use compounds as classified by the following Color Index Names:

Food Red 10

Acid Blue 9

Acid Green 16

Acid Violet 17.

The concentration, depending for example on the desired depth of color, is from about 0.01 to about 0.1% by weight, but may be above or below in order, for example, to achieve particular effects.

Moreover, as further additives, the shaped article of the invention may contain, for example, solids such as highly disperse silica in an amount of from about 0.1 to about 1% by weight, cellulose derivatives such as carboxymethylcellulose in an amount of from about 0.1 to about 1% by weight, polyvinyl alcohol in an amount of from 0.1 to about 0.5% by weight, or polyethylene glycol in an amount of from about 0.1 to about 0.5% by weight, based in each case on the weight of the shaped article.

EXAMPLES

Production of the Shaped Articles 90.82 parts of Primal J 200, 9.08 parts of Disponil A 4065 EXP (2% strength solution) and 0.1 part of Foammaster 306 were mixed and homogenized in a glass beaker with stirring at ambient temperature for 30 minutes. Subsequently, the resulting dispersion was degassed. To produce the shaped articles of the invention, the dispersions were transferred to an antiadhesively coated mold and filmed at temperatures between ambient temperature and 85° C. Governed by the fill level, film thicknesses of from 0.01 mm to 5 mm were achieved. For testing, the films were cut or punched to defined sizes.

Test I: Determination of the Peel Strength and Tensile Shear Strength on Copier Paper The test articles with the dimensions 40 mm*80 mm were cut from copier paper. Two strips in each case were bonded to one another by means of the shaped articles with the dimensions 25 mm*25 mm*1 mm and loaded by rolling on using a 1 kg roller.

The copier paper used was type 5015 white, 80 g/m$^2$, from Sonnecken.

When determining the tensile shear strength, the paper strips were additionally reinforced by bonding polystyrene strips 4 mm thick onto one side.

The peel strength was determined at an angle of 90°.

Following conditioning for 24 h at RT and 50% AH, the strengths were measured with the aid of a tensile strength measuring instrument from Erichsen, model 464, measuring head T 709/200 N, at a rate of advance 50 mm/min.

The results can be found in Table 1.

Test II: Determination of the Long-term Load

The strengths were determined on the following material:
Polystyrene/polystyrene The test articles with the dimensions 26 mm*80 mm were cleaned and degreased in an ultrasound bath.

With the aid of the pressure-sensitively adhesive shaped articles with the dimensions 26 mm*25 mm *1 mm, two test articles in each case were then bonded to one another and loaded by rolling on using a 1 kg roller.

With aid of a drilled hole at the top end, the test specimens were suspended freely and weighted at the bottom end with a 200 g weight.

Storage took place at RT and 50% AH.

Assessment was made objectively: loading test passed or not passed. The results can be found in Table 2.

Test III: Test of the Reusability of Copier Paper Without Cleaning of the Pressure-sensitively Adhesive Shaped Articles The test articles with the dimensions 40 mm*80 mm were cut from copier paper. Two strips in each case were bonded to one another by means of the pressure-sensitively adhesive shaped articles with the pressure-dimensions 25 mm*25 mm*1 mm and loaded by rolling on using a 1 kg roller.

When determining the tensile shear strength, the paper strips were additionally reinforced by bonding polystyrene strips 4 mm thick onto one side.

Between each application, the pressure-sensitively adhesive shaped articles were bonded again in the manner described above (without cleaning).

At RT and 50% AH (atmospheric humidity), the strengths were measured with the aid of a tensile strength measuring instrument from Erichsen, model 464, measuring head T 709/200 N, in accordance with the test setups sketched in FIGS. 1 and 2 (rate of advance 50 mm/min).

The results can be found in Table 3.

Test IV: Test of the Reusability of Copier Paper with Mechanical Cleaning of the Pressure-sensitively Adhesive Shaped Articles Under Water The test articles with the dimensions 40 mm*80 mm were cut from copier paper. J two strips were bonded to one another by means of the pressure-sensitively adhesive shaped articles with the dimensions 25 mm *25 mm*1 mm and loaded by rolling on using a 1 kg roller.

When determining the tensile shear strength, the paper strips were additionally reinforced by bonding polystyrene strips 4 mm thick onto one side.

Between the two applications, the pressure-sensitively adhesive shaped articles were soiled by contacting them with body fat to an extent such that adhesion was no longer measurable.

Subsequently, they were cleaned mechanically under running water and bonded again in the manner described above.

At RT and 50% AH, the strengths were measured with the aid of a tensile strength measuring instrument from Erichsen, model 464, measuring head T 709/200 N, in accordance with the test setup sketched in FIGS. 1 and 2 (rate of advance 50 mm/min).

The results can be found in Table 4.

Test V: Test for Greasing and Discoloration on Copier Paper

In the test for greasing and for discoloration on copier paper, the formulation used to produce the shaped article was either in the original form (test for greasing) of admixed with in each case with 0.1% by weight of a dye. Subsequently, corresponding bonds on copier paper were made, and the bonded test articles were stored under the ambient conditions indicated below.

The dyes used were the dyes FL green, red and blue.

The test articles with the dimensions 40 mm*80 mm were cut from copier paper. Two strips in each case were bonded to one another by means of the pressure-sensitively adhesive shaped articles with the dimensions 25 mm*25 mm*1 mm and loaded by rolling on using a 1 kg roller.

The test articles were then acclimatized under the following conditions:

RT (i.e., room temperature, about 18–23° C.)
30° C./80% rel. atmospheric humidity
40° C./20% rel. atmospheric humidity
50° C.

After intervals of four weeks (total duration: six months), the test articles were subjected to a subjective assessment by holding them up to the light from a 60 watt desk lamp and examining them visually for greasing, spots and discoloration.

Criteria: visual changes—yes or no.

The results can be found in Tables 5, 6, 7 and 8.

Comparison Test I: Determination of the Peel Strength and Tensile Shear Strength on Copier Paper Shaped articles were produced as indicated above under "Production of the adhesive articles", using octylphenol with 40 ethylene oxide units instead of Disponil A 4065 EXP (2% strength solution).

The test was conducted identically to the test described under "test I". The results can be found in Table 9.

Comparative Test II: Determination of the Long-term Load

The determination of the long-term load was performed with shaped articles identical to comparative test I. The implementation of the comparative test was carried out under test conditions identical to "test II". The results can be found in Table 10.

TABLE 1

| Surfactant content [%] | Tensile shear strength (FIG. 2) [N/cm²] | Peel strength (FIG. 3) [N/25 mm] |
|---|---|---|
| 0 | partial paper tear | partial paper tear |
| 0.09 | 9.87 | partial paper tear |
| 0.18 | 9.45 | 7.27 |
| 0.27 | 9.67 | 5.99 |
| 0.38 | 9.88 | 4.31 |
| 0.49 | 9.64 | 2.35 |

TABLE 2

| Surfactant content [%] | Time loading with 32 g/cm² for 6 months |
|---|---|
| 0 | satisfactory |
| 0.09 | satisfactory |
| 0.18 | satisfactory |
| 0.27 | satisfactory |
| 0.38 | satisfactory |
| 0.49 | satisfactory |

Test specimens: two strips in each case of polystyrene of dimensions 25 mm*80 mm*4 mm bonded by an adhesive article with the dimensions 25 mm*25 mm *1 mm by rolling on with a 1 kg roller.

Test setup: the test articles were suspended at the top end and weighted at the bottom end with 200 g weights.
Test temperature: RT
Evaluation: visual assessment
Tensile shear strength on long-term loading

TABLE 3

|  | Tensile shear strength (FIG. 2) [N/cm²] | Peel strength (FIG. 3) [N/25 mm] |
|---|---|---|
| 1st application | 9.45 | 7.30 |
| 2nd application | 8.88 | 7.15 |
| 3rd application | 6.90 | 6.40 |
| 4th application | 6.32 | 5.30 |
| 5th application | 5.40 | 4.82 |
| 6th application | 5.21 | 4.35 |
| 7th application | 4.63 | 3.90 |
| 8th application | 3.04 | 2.91 |

TABLE 4

|  | Tensile shear strength (FIG. 2) [N/cm²] | Peel strength (FIG. 3) [N/25 mm] |
|---|---|---|
| 1st application | 9.42 | 7.34 |
| after soiling | not measurable | not measurable |
| 2nd application | 6.90 | 6.40 |

TABLE 5

| Storage time [months] | RT V. | RT K.V. | 30° C./80% rel. AH V. | 30° C./80% rel. AH K.V. | 40° C./20% rel. AH V. | 40° C./20% rel. AH K.V. | 50° C. V. | 50° C. K.V. |
|---|---|---|---|---|---|---|---|---|
| 1 |  | + |  | + |  | + |  | + |
| 2 |  | + |  | + |  | + |  | + |
| 3 |  | + |  | + |  | + |  | + |
| 4 |  | + |  | + |  | + |  | + |
| 5 |  | + |  | + |  | + |  | + |
| 6 |  | + |  | + |  | + |  | + |

V. = greasing
K.V. = no greasing

TABLE 6

Long-term climate storage
Dye FL green (discoloration) (0.1% dye)

| Storage time [months] | RT V. | RT K.V. | 30° C./80% rel. AH V. | 30° C./80% rel. AH K.V. | 40° C./20% rel. AH V. | 40° C./20% rel. AH K.V. | 50° C. V. | 50° C. K.V. |
|---|---|---|---|---|---|---|---|---|
| 1 |  | + |  | + |  | + |  | + |
| 2 |  | + |  | + |  | + |  | + |
| 3 |  | + |  | + |  | + |  | + |
| 4 |  | + |  | + |  | + |  | + |
| 5 |  | + |  | + |  | + |  | + |
| 6 |  | + |  | + |  | + |  | + |

V. = greasing
K.V. = no greasing

TABLE 7

Long-term climate storage
Dye FL red (0.1% dye)

| Storage time [months] | RT V. | RT K.V. | 30° C./80% rel. AH V. | 30° C./80% rel. AH K.V. | 40° C./20% rel. AH V. | 40° C./20% rel. AH K.V. | 50° C. V. | 50° C. K.V. |
|---|---|---|---|---|---|---|---|---|
| 1 |  | + |  | + |  | + |  | + |
| 2 |  | + |  | + |  | + |  | + |
| 3 |  | + |  | + |  | + |  | + |
| 4 |  | + |  | + |  | + |  | + |
| 5 |  | + |  | + |  | + |  | + |
| 6 |  | + |  | + |  | + |  | + |

V. = greasing
K.V. = no greasing

TABLE 8

Long-term climate storage
Dye FL blue (0.1% dye)

| Storage time [months] | RT V. | RT K.V. | 30° C./80% rel. AH V. | 30° C./80% rel. AH K.V. | 40° C./20% rel. AH V. | 40° C./20% rel. AH K.V. | 50° C. V. | 50° C. K.V. |
|---|---|---|---|---|---|---|---|---|
| 1 |  | + |  | + |  | + |  | + |
| 2 |  | + |  | + |  | + |  | + |
| 3 |  | + |  | + |  | + |  | + |
| 4 |  | + |  | + |  | + |  | + |
| 5 |  | + |  | + |  | + |  | + |
| 6 |  | + |  | + |  | + |  | + |

V. = greasing
K.V. = no greasing

TABLE 9

| Octylphenol-40 EO content [%] | Tensile shear strength [N/cm$^2$] | Peel strength [N/25 mm] |
|---|---|---|
| 0 | partial paper tear | partial paper tear |
| 0.09 | partial paper tear | partial paper tear |
| 0.18 | partial paper tear | partial paper tear |
| 0.27 | partial paper tear | partial paper tear |
| 0.38 | partial paper tear | partial paper tear |
| 0.54 | partial paper tear | partial paper tear |
| 0.63 | 9.96 | partial paper tear |
| 0.8 | 9.46 | partial paper tear |
| 1.08 | 8.73 | partial paper tear |
| 1.21 | 8.30 | partial paper tear |
| 1.45 | 7.26 | 7.12 |
| 1.61 | 6.67 | 6.72 |
| 1.83 | 5.43 | 5.98 |
| 1.99 | 5.06 | 4.23 |
| 2.24 | 4.29 | 3.85 |
| 2.51 | 3.50 | 2.77 |

TABLE 10

Long-term loading of the formulation with octylphenol-40 EO on polystyrene/polystryrene

| Octylphenol-40 EO content [%] | Time loading with 32 g/cm$^2$ for 6 months |
|---|---|
| 0 | sat. |
| 0.09 | sat. |
| 0.18 | sat. |
| 0.27 | sat. |
| 0.38 | sat. |
| 0.54 | sat. |
| 0.63 | sat. |
| 0.8 | sat. |
| 1.08 | sat. |
| 1.21 | sat. |
| 1.45 | unsat. |
| 1.61 | unsat. |
| 1.83 | unsat. |
| 1.99 | unsat. |
| 2.24 | unsat. |
| 2.51 | unsat. |

What is claimed is:

1. A self-supporting, shaped article having a first pressure-sensitively adhesive surface and a second pressure-sensitively adhesive surface and a glass transition temperature of less than 10° C., comprising
   (a) at least 90% by weight of a binder comprised of at least one polymer selected from the group consisting of addition polymers, addition copolymers, and mixtures thereof; and
   (b) from 0.01 to 1.44% by weight of at least one nonionic surfactant selected from the group consisting of aliphatic nonionic surfactants, cycloaliphatic nonionic surfactants and mixtures thereof,
   wherein said first and second pressure-sensitively adhesive surfaces have an essentially identical bond strength with respect to identical material surfaces, and wherein said first and second pressure-sensitively adhesive surfaces are redetachable from the same or different material surfaces.

2. The self-supporting, shaped article of claim 1 wherein at least one nonionic surfactant is a compound of general formula (I):

$$R^1-[(CR^2H-CH_2-)_n-O-CR^2H-CH_2-OH]_y \quad (I)$$

wherein $R^1$ represents an alkyl radical of 2 to 26 carbon atoms or a cycloalkyl radical of 4 to 26 carbon atoms, $R^2$ in each case independently represents hydrogen or an alkyl radical of 1 to about 10 carbon atoms, n is a number from 0 to 200, and y is a number from 1 to 6.

3. The self-supporting, shaped article of claim 2 wherein $R^1$ represents an alkyl radical substituted with one or more OH groups selected from the group consisting of secondary OH groups and tertiary OH groups.

4. The self-supporting, shaped article of claim 2 wherein $R^1$ represents a cycloalkyl radical substituted with at least one OH group selected from the group consisting of secondary OH groups and tertiary OH groups.

5. The self-supporting, shaped article of claim 1 wherein at least one nonionic surfactant is an alkyl polyglycoside of general formula II:

$$R^3O-(Z)_x \quad (II)$$

wherein $R^3$ represents an alkyl radical of 2 to 24 carbon atoms, Z independently at each occurrence represents a monosaccharide or oligosaccharide of a sugar having 5 or 6 carbon atoms and X represents a number from 1.1 to 5.

6. The self-supporting, shaped article of claim 1 wherein said binder comprises at least one polymer prepared by addition polymerization or copolymerization of at least one ester selected from the group consisting of esters of acrylic acid and esters of methacrylic acid.

7. The self-supporting, shaped article of claim 1 wherein said binder comprises at least one polymer prepared by addition polymerization or copolymerization of at least one ester of acrylic acid or methacrylic acid and an alcohol having 1 to 24 carbon atoms.

8. The self-supporting, shaped article of claim 1 wherein said binder is comprised of at least 50% by weight of polybutyl acrylate.

9. The self-supporting, shaped article of claim 1 comprising 0.05 to 0.8% by weight of said at least one nonionic surfactant.

10. The self-supporting, shaped article of claim 1 comprising at least 95% by weight of said binder.

11. The self-supporting, shaped article of claim 1 comprising at least one alkyl polyglycoside of general formula II:

$$R^3O-(Z)_x \quad (II)$$

wherein $R^3$ represents an alkyl radical of 8 to 16 carbon atoms, Z represents a glucose radical, and X represents a number from 1.1 to 1.4.

12. The self-supporting, shaped article of claim 1 comprising at least one compound of general formula (I):

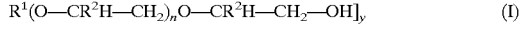

$$R^1(O-CR^2H-CH_2)_nO-CR^2H-CH_2-OH]_y \quad (I)$$

wherein $R^1$ represents an alkyl radical of 8 to 16 carbon atoms, $R^2$ independently at each occurrence represents hydrogen or methyl, n represents a number from 0 to 100 and y represents a number from 1 to 6.

13. The self-supporting, shaped article of claim 1 wherein the glass transition temperature of the shaped article is from about −200° C. to about −50° C.

14. The self-supporting, shaped article of claim 1 wherein said at least one polymer is in the form of an aqueous emulsion or dispersion having a solids content of between about 20 and about 90% by weight.

15. The self-supporting, shaped article of claim 1 wherein said shaped article is in web or sheet form and has a thickness of from about 0.01 to about 10 mm.

16. The self-supporting, shaped article of claim 1 wherein a detachable coating is affixed to at least one of said first pressure-sensitively adhesive surface or said second pressure-sensitively adhesive surface.

17. The self-supporting, shaped article of claim 1 wherein said shaped article contains less than 0.1% by weight of nonionic surfactants having an aromatic structural component.

18. The self-supporting, shaped article of claim 1 additionally comprising at least, one additive selected from the group consisting of preservatives, dyes, and defoamers.

19. The self-supporting, shaped article of claim 1 wherein all of the nonionic surfactants in said shaped article are saturated nonionic surfactants.

20. A self-supporting, shaped article having a first pressure-sensitively adhesive surface, a second pressure-sensitively adhesive surface, and a glass transition temperature of from about 0 to about −60° C., wherein:

the shaped article is in web or sheet form having thickness of about 0.01 to about 10 mm;
the shaped article is comprised of at least 90% by weight of a binder and from 0.05 to 0.8% by weight of at least one nonionic surfactant selected from the group consisting of one or more compounds of general formula (I)

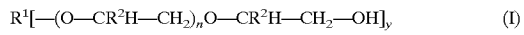

$$R^1[-(O-CR^2H-CH_2)_nO-CR^2H-CH_2-OH]_y \quad (I)$$

wherein $R^1$ represents an alkyl radical of 2 to 26 carbon atoms or a cycloalkyl radical of 4 to 26 carbon atoms, $R^2$ in each case independently represents hydrogen or an alkyl radical of 1 to about 10 carbon atoms, n is a number form 0 to 200, and y is a number from 1 to 6;
one or more alkyl polyglycosides of general formula (II)

$$R^3O-(Z)_x \quad (II)$$

wherein $R^3$ represents an alkyl radical of 2 to 24 carbon atoms, Z independently at each occurrence represents a monosaccharide or oligosaccharide of a sugar having 5 or 6 carbon atoms and X represents a number tom 1.1 to 5; and
mixtures thereof;
said binder comprises at least one polymer selected from the group consisting of addition polymers, addition copolymers and mixtures thereof, with at least one polymer being prepared by addition polymerization or copolymerization of at least one ester selected from the group consisting of esters of acrylic acid and esters of methacrylic acid and in the form of an aqueous emulsion or dispersion having a solids content of between about 20 and about 90% by weight; and said first and second pressure-sensitively adhesive surfaces having an essentially identical bond strength with respect to identical material surfaces, and wherein said first and second pressure-sensitively adhesive surfaces are redetachable from the same or different material surfaces.

21. The self-supporting, shaped article of claim 20 wherein said binder is comprised of at least 50% by weight of polybutyl acrylate.

22. The self-supporting, shaped article of claim 20 comprising at least one alkyl glycoside of general formula (II) wherein $R^3$ represents an alkyl radical of 8 to 16 carbon atoms, Z represents a glucose radical, and X represents a number from 1.1 to 1.4.

23. The self-supporting, shaped article of claim 20 comprising at least one compound of general formula (I) wherein $R^1$ represents an alkyl radical of 8 to 16 carbon atoms and $R^2$ independently at each occurrence represents hydrogen or methyl.

24. The self-supporting, shaped article of claim 20 wherein a detachable coating is affixed to at least one of said first pressure-sensitively adhesive surface or said second pressure-sensitively adhesive surface.

25. The self-supporting, shaped article of claim 20 additionally comprising at least one additive selected from the group consisting of defoamers, preservatives and dyes.

26. The self-supporting, shaped article of claim 20 wherein the glass transition temperature of the shaped article is from about −20° C. to about −50° C.

27. The self-supporting, shaped article of claim 20 wherein said shaped article has a thickness of from about 0.5 mm to about 2 mm.

28. The self-supporting, shaped article of claim 20 wherein said at least one polymer is prepared by addition polymerization or copolymerization of at least one ester selected from the group consisting of esters of acrylic or methacrylic acid with alcohols having from 1 to 9 carbon atoms.

29. The self-supporting, shaped article of claim 20 wherein said at least one polymer is prepared by emulsion polymerization or copolymerization of at least one ester selected from the group consisting of methyl, ethyl, propyl, isopropyl, butyl, hexyl, heptyl, octyl, 2-ethyl hexyl and nonyl esters of acrylic acid and methacrylic acid.

30. The self-supporting, shaped article of claim 20 wherein said at least one polymer is prepared by addition polymerization or copolymerization of at least one acrylic or methacrylic ester having from 3 to 6 carbon atoms in the alcohol residue.

31. The self-supporting, shaped article of claim 20 wherein said at least one polymer is a copolymer prepared from a monomer mixture comprising from about 0.1 to about 10% by weight of acrylic acid, methacrylic acid, or a mixture thereof.

32. A method of adhering an article to a surface, said method comprising adhering the first pressure-sensitively adhesive surface of the self-supporting, shaped article of claim 20 to said article and adhering the second pressure-sensitively adhesive surface of the shaped article of claim 20 to said surface or in reverse order.

33. The method of claim 32 wherein one or both of said article or said surface is comprised of paper.

34. The method of claim 32 wherein said surface is a vertical surface.

35. The self-supporting, shaped article of claim 20 wherein said first and second pressure-sensitively adhesive surfaces are redetachable from the same or different material surfaces numerous times.

36. The self-supporting, shaped article of claim 1 wherein said first and second pressure-sensitively adhesive surfaces are redetachable from the same or different material surfaces numerous times.

37. A method of removably adhering an article to a surface, said method comprising (1) obtaining a self-supporting, shaped article having a first pressure-sensitively adhesive surface and a second pressure-sensitively adhesive surface and a glass transition temperature of less than 10° C., comprising (a) at least 90% by weight of a binder comprised of at least one polymer selected from the group consisting of addition polymers, addition copolymers, and mixtures thereof; and (b) from 0.01 to 1.44% by weight of at least one nonionic surfactant selected from the group consisting of aliphatic nonionic surfactants, cycloaliphatic nonionic surfactants and mixtures thereof, wherein said first and second pressure-sensitively adhesive surfaces have an essentially identical bond strength with respect to identical material surfaces, and wherein said first and second pressure-sensitively adhesive surfaces are redetachable from the same or different material surfaces;

(b) adhering the first pressure-sensitively adhesive surface of the self-supporting, shaped article to said article and adhering the second pressure-sensitively adhesive surface of the self-supporting, shaped article to said surface or in the reverse order, and, (c) detaching either the self-supporting, shaped article from said surface or detaching the article from the self-supporting, shaped article.

38. The method of claim 37 wherein steps (b) and (c), and (a) if needed, are repeated one or more times.

39. The method of claim 38 wherein, between one or more of the repeated attachment steps, the surface of said first or second pressure-sensitively adhesive surfaces is cleaned.

40. The method of claim 37 wherein one or both of said article or said surface is comprised of a material selected from the group consisting of paper, metal, glass or plastic.

41. The method of claim 37 wherein said surface is a vertical, inclined or horizontal surface of a table, cupboard or wall.

* * * * *

UNITED STATES PATENT AND TRADEMARK OFFICE
CERTIFICATE OF CORRECTION

PATENT NO.    : 6,555,217 B1
DATED         : April 29, 2003
INVENTOR(S)   : Mueller et al.

It is certified that error appears in the above-identified patent and that said Letters Patent is hereby corrected as shown below:

<u>Title page,</u>
Item [57], ABSTRACT,
Line 4, delete "cyoaliphatic" and insert therefore -- cycloaliphatic --.

<u>Column 18,</u>
Line 5, delete "-200º" and insert therefore -- -20º --
Line 42, replace formula (I) with -- $R^1[-(O-CR^2H-CH_2-)_nO-CR^2H-CH_2-OH]_y$ --
Line 48, delete "form" and insert therefore -- from --
Line 56, delete "tom" and insert therefore -- from --

Signed and Sealed this

Second Day of November, 2004

JON W. DUDAS
*Director of the United States Patent and Trademark Office*